United States Patent
Markus et al.

(10) Patent No.: US 11,029,874 B2
(45) Date of Patent: Jun. 8, 2021

(54) ROLLING XOR PROTECTION IN EFFICIENT PIPELINE

(71) Applicant: Western Digital Technologies, Inc., San Jose, CA (US)

(72) Inventors: Yoav Markus, Tel-Aviv (IL); Alexander Bazarsky, Holon (IL); Alexander Kalmanovich, Jerusalem (IL)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 66 days.

(21) Appl. No.: 16/526,866

(22) Filed: Jul. 30, 2019

(65) Prior Publication Data

US 2021/0034272 A1    Feb. 4, 2021

(51) Int. Cl.
*G06F 3/06* (2006.01)

(52) U.S. Cl.
CPC .......... *G06F 3/0647* (2013.01); *G06F 3/0619* (2013.01); *G06F 3/0652* (2013.01); *G06F 3/0659* (2013.01); *G06F 3/0673* (2013.01)

(58) Field of Classification Search
CPC .... G06F 3/0647; G06F 3/0619; G06F 3/0652; G06F 3/0659; G06F 3/0673
See application file for complete search history.

(56) References Cited

U.S. PATENT DOCUMENTS

| | | | |
|---|---|---|---|
| 8,001,104 B2 | 8/2011 | Frondozo et al. | |
| 8,074,149 B2 * | 12/2011 | Stolowitz | G06F 3/0617 714/770 |
| 8,775,717 B2 | 7/2014 | Prins et al. | |
| 8,775,901 B2 | 7/2014 | Sharon et al. | |
| 9,514,837 B2 | 12/2016 | Shapira et al. | |
| 9,665,287 B2 | 5/2017 | Li et al. | |
| 9,891,859 B1 * | 2/2018 | Vogan | G06F 3/0653 |
| 2015/0339187 A1 * | 11/2015 | Sharon | G06F 11/1068 714/766 |
| 2016/0085625 A1 * | 3/2016 | Amato | G06F 3/0679 714/766 |
| 2017/0004052 A1 * | 1/2017 | Manohar | G06F 12/0875 |
| 2017/0228299 A1 * | 8/2017 | Shapira | G06F 3/0652 |
| 2017/0249207 A1 * | 8/2017 | Sharon | G06F 11/1004 |
| 2017/0317693 A1 * | 11/2017 | Yang | G11C 11/5628 |
| 2018/0143876 A1 * | 5/2018 | Yang | G06F 11/1072 |
| 2019/0065080 A1 * | 2/2019 | Tanpairoj | G06F 3/061 |
| 2020/0073793 A1 * | 3/2020 | Saito | G06F 12/00 |

(Continued)

*Primary Examiner* — Ryan Bertram
(74) *Attorney, Agent, or Firm* — Patterson & Sheridan, LLP; Steven H. Versteeg

(57) ABSTRACT

Systems, apparatus and methods for generation of XOR signature metadata and XOR signature management are presented. In one or more embodiments, a storage device controller includes a host interface, configured to receive one or more string lines (SLs) of data from a host, the one or more SLs to be programmed into a non-volatile memory (NVM), and processing circuitry. The processing circuitry is configured to, for each of the one or more SLs, generate signature metadata and provide the signature metadata in a header of the SL. The processing circuitry is still further configured to XOR two or more of the SLs with their respective signature metadata to generate a snapshot, and write the snapshot to the NVM.

19 Claims, 9 Drawing Sheets

(56) References Cited

U.S. PATENT DOCUMENTS

| | | | |
|---|---|---|---|
| 2020/0194064 A1* | 6/2020 | Barndt | G11C 16/0483 |
| 2020/0218606 A1* | 7/2020 | Ji | G11C 29/52 |
| 2020/0257598 A1* | 8/2020 | Yazovitsky | G11C 29/52 |
| 2020/0264792 A1* | 8/2020 | Paley | G06F 3/0679 |

* cited by examiner

| Byte Position | 0 | 1 | 2 | 3 |
|---|---|---|---|---|
| Data | Die 0 data | Die 1 data | Die 2 data | Die 3 data |

FIG. 4

| FMU in logical Page for DIE 0 | 0 | 1 | 2 | 3 |
|---|---|---|---|---|
| Control Data | 300 | 0 | 0 | 0 |

510

XOR

| FMU in logical Page for DIE 1 | 0 | 1 | 2 | 3 |
|---|---|---|---|---|
| Control Data | 0 | 300 | 0 | 0 |

520

=

| FMU in logical Page for Signature | 0 | 1 | 2 | 3 |
|---|---|---|---|---|
| Control Data | 300 | 300 | 0 | 0 |

| FMU in logical Page for DIE 0 | 0 | 1 | 2 | 3 |
|---|---|---|---|---|
| Control Data | 300 | 0 | 0 | 0 |

510

XOR

| FMU in logical Page for DIE 1 | 0 | 1 | 2 | 3 |
|---|---|---|---|---|
| Control Data | 0 | 300 | 0 | 0 |

520

XOR

| FMU in logical Page for DIE 2 | 0 | 1 | 2 | 3 |
|---|---|---|---|---|
| Control Data | 0 | 0 | 300 | 0 |

530

XOR

| FMU in logical Page for DIE 3 | 0 | 1 | 2 | 3 |
|---|---|---|---|---|
| Control Data | 0 | 0 | 0 | 300 |

540

=

| FMU in logical Page for Signature | 0 | 1 | 2 | 3 |
|---|---|---|---|---|
| Control Data | 300 | 300 | 300 | 300 |

ROLLING XOR PROTECTION IN EFFICIENT PIPELINE

BACKGROUND OF THE DISCLOSURE

Field of the Disclosure

Embodiments of the present disclosure generally relate to non-volatile memory systems, and in particular, to management of rolling XOR protection in a storage device.

Description of the Related Art

Flash storage devices employ multi-level cell (MLC) technology to store more data in less material. In a MLC flash memory, for example, a single cell may store two, three or even four bits, as opposed to the prior type of flash, single cell technology (SLC) which stores one bit per cell. MLC memory, however, presents certain challenges regarding, for example, reliability and read/write latency. Modern memory devices may include both SLC and MLC blocks.

In MLC memories, different write methods may be employed. One method involves a direct write to MLC, where data received from a host is written directly to MLC storage without first writing it to single layer cell (SLC) storage. This method is preferred in terms of write latency, as the data need only be written once. But, this method exposes the host data to reliability issues.

For example, one of the issues is that MLC is prone to wordline to wordline (WL2WL) shorts. Thus, there is a need to take steps to protect against such shorts so that data is not lost when programming a MLC memory with successive wordlines (WLs). The WL2WL shorts generally occur during the write process, when stress is applied to the WL.

Different strategies have been advanced to handle this. For example, in one approach, termed SLC first, instead of programming data to MLC blocks, which, as noted, are prone to failure, host data is always first programmed to the more reliable SLC blocks. When data is later relocated to an MLC block, if the MLC programming fails, the data can be restored from the SLC source block. This approach has two significant drawbacks. First, because the SLC block pool is small, for example, approximately 10%, performance of sustained write is substantially degraded, as relocation from SLC to MLC in parallel to host writes is required. Second, the endurance of the device is affected since all host data must be written twice.

Another approach is known as "rolling XOR." In rolling XOR, signatures of the host data are temporarily stored in SLC, while, in parallel, the host data is written directly to MLC. The signatures, also referred to as "snapshots", include one or more WLs to be programmed to different dies XORed with each other. As a result, there is no need to stall the write to MLC, and overprovisioning is minimized because the signatures are erased from SLC after the write process.

Implementing rolling XOR requires careful management of a database of stored XOR snapshots. Inevitably, complications may arise. For example, not all dies may be XORed, which creates only a partial XOR signature. Or, for example, not all dies may be written to when a power failure occurs. Or, for example, an XOR signature may be deleted before all of its participating WLs were included in it.

It is therefore desirable to have a scheme for XOR signature management that provides recovery from power loss and other exceptions in an optimized pipeline.

SUMMARY OF THE DISCLOSURE

The present disclosure generally describes systems, apparatus and methods for generating XOR signature metadata and XOR signature management. In one or more embodiments, a storage device controller includes a host interface, configured to receive one or more string lines (SL)s from a host, the one or more SLs to be programmed into a NVM, and processing circuitry. The processing circuitry is configured to, for each of the one or more SLs, generate signature metadata and provide the metadata in a header of the SL. The processing circuitry is further configured to XOR two or more of the SLs with the appended signature metadata to generate a snapshot, and store the snapshot in the NVM.

In one embodiment, a storage device includes SLC NVM and MLC NVM, and a device controller. The device controller includes a host interface, configured to receive a current SL of data from a host, the current SL one of a set of SLs to be programmed into dies of the MLC NVM. The device controller further includes processing circuitry, configured to generate signature metadata for the current SL and store the metadata in temporary storage by overwriting a previously stored version of the signature metadata, XOR the current SL with a previously stored version of a signature to generate an updated signature and store the updated signature in temporary storage by overwriting a previous version of the signature, and program both the updated signature and the signature metadata to a block of the SLC NVM.

In another embodiment, an apparatus includes means for determining, following an ungraceful shut-down (UGSD), whether a write process to a MLC NVM was ongoing, and means for reading metadata of a last written XOR signature to a SLC NVM, the XOR signature protecting the data being written to the MLC NVM. The apparatus further includes means for determining if the last written XOR signature is a partial signature.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 illustrates encoding metadata from several dies so as to be preserved over the signature formation process, in accordance with embodiments disclosed herein.

FIG. 5A illustrates an example of an XOR of signature metadata for two dies, in accordance with embodiments disclosed herein.

FIG. 5B illustrates an example of an XOR of signature metadata for four dies, in accordance with embodiments disclosed herein.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
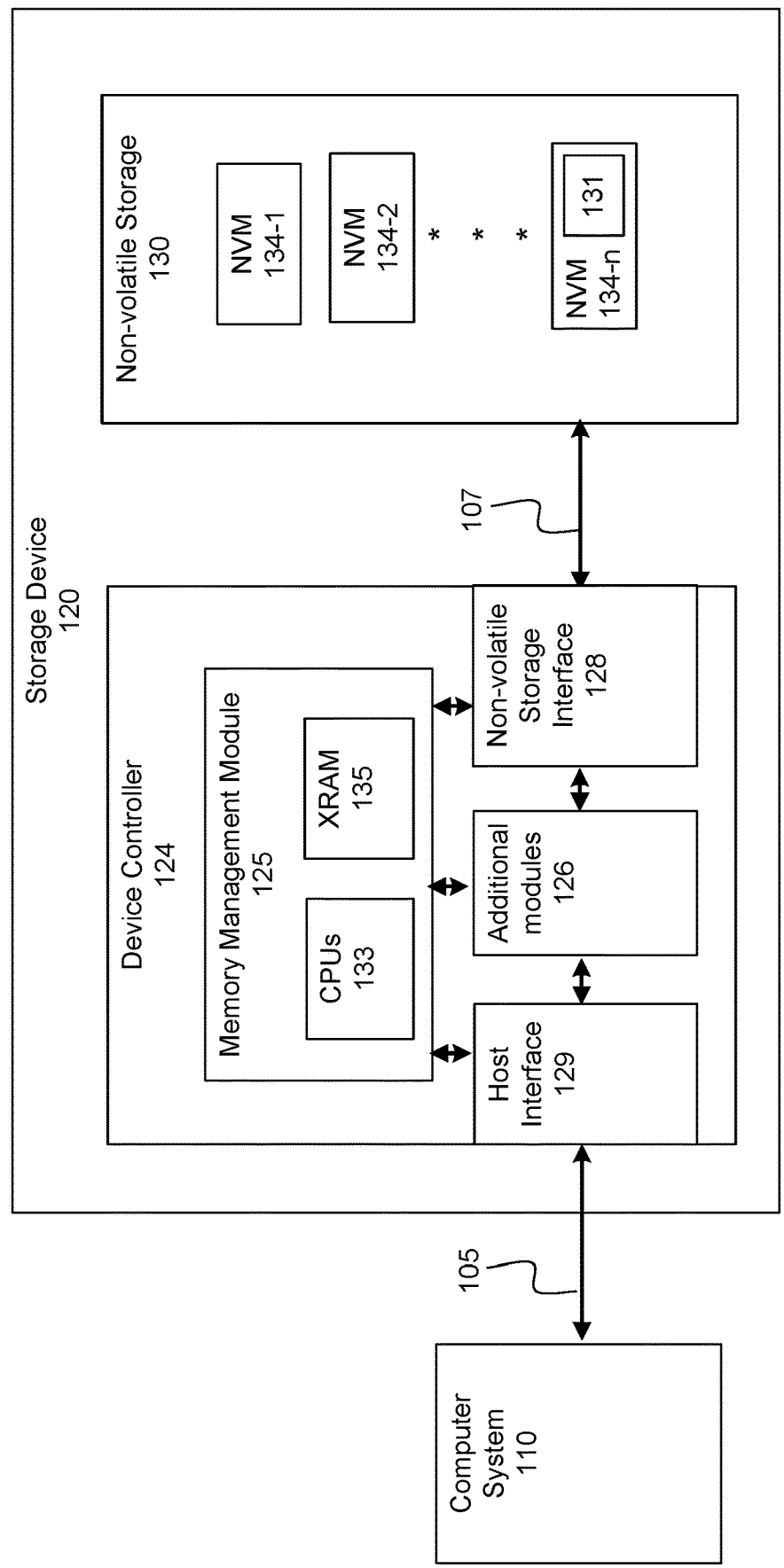
FIG. 1 is a block diagram illustrating an implementation of a data storage system, in accordance with embodiments disclosed herein.

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Systems, apparatus and methods for generation of XOR signature metadata and XOR signature management. In one or more embodiments, a storage device controller includes a host interface, configured to receive one or more SLs from a host, the one or more SLs to be programmed into a MLC NVM, and processing circuitry. The processing circuitry is configured to, for each of the one or more SLs, generate signature metadata and provide the metadata in a header of the SL. The processing circuitry is further configured to XOR two or more of the SLs with the appended signature metadata to generate a snapshot, and store the snapshot in SLC NVM.

It is noted that in the following disclosure, the terms "signature" and "snapshot" may be used interchangeably. For example, each may refer to the product of an XOR operation performed on multiple word lines of data, such as may be received form a host by a controller of a NVM.

It is also noted that in the following disclosure, when discussing MLC, the term MLC may be used to refer to all multi-level cell memories, where a single cell may store two, three or even four bits, or, alternatively, as will be clear from the context, the term MLC may be used to refer only to a cell that stores two bits, in contrast to the term TLC to refer to a cell that stores three bits and the term QLC to refer to a cell that stores four bits.

As noted above, there are some challenges involved in managing a database of XOR snapshots in connection with rolling XOR. For example, if not all of the dies in a meta-die are XORed together, then only a partial signature is created. Or, for example, if a XOR signature for a SL from each of four dies has been written to SLC, but the actual protected data was programmed in only, for example, two out of the four dies. Or, for example, two out of three components of a signature were programmed. In each of these, and in similar examples, there is a discrepancy between protected data actually programmed into MLC and a signature or snapshot that is supposed to cover all of that data. Thus, it is easily seen that not only does a backup snapshot (XOR signature data) database require management, but that also not a simple 1:1 mapping between protected data and its corresponding back up signatures.

Various embodiments in accordance with this disclosure implement methods to manage XOR signatures and recover from sudden loss of power, also known as an ungraceful shut down (UGSD), as well as exceptions in an optimized protection pipeline. Implementations according to various embodiments may be provided in a controller of a storage device. In one or more embodiments, a storage device controller is required to withstand different problematic conditions, such as UGSD, a temporary loss of NAND power (VDET) and other exceptions that may occur during the operation of a data storage system.

In one or more embodiments, reliable and efficient rolling XOR recovery schemes are provided to enable protection from various failure modes in any rolling XOR configuration. In one or more embodiments, an adaptive protection scheme may be provided for use, for example, with any memory that suffers from WL-WL shorts.

FIG. 1 is a block diagram illustrating an implementation of a data storage system, in accordance with various embodiments. While some example features are illustrated, various other features have not been illustrated for the sake of brevity and so as not to obscure pertinent aspects of the example embodiments disclosed herein. To that end, as a non-limiting example, data storage system 100 includes a storage device 120 (also sometimes called an information storage device, or a data storage device, or a memory device), which includes a device controller 124 and non-volatile storage 130, and is used in conjunction with or includes a computer system 110 (e.g., a host system or a host computer). In some embodiments, non-volatile storage 130 is a single flash memory device while in other embodiments non-volatile storage 130 includes a plurality of flash memory devices. In some embodiments, non-volatile storage 130 is NAND-type flash memory or NOR-type flash memory. In some embodiments, non-volatile storage 130 includes one or more three-dimensional (3D) memory devices. In some embodiments, some of the memory cells of non-volatile storage 130 are configured to store two, three or four bits per memory cell, and others are configures to store a single bit per memory cell. Further, in some embodiments, device controller 124 is a solid-state drive (SSD) controller. However, other types of storage media may be included in accordance with aspects of a wide variety of embodiments (e.g., PCRAM, ReRAM, STT-RAM, etc.). In some embodiments, a flash memory device includes one or more flash memory die, one or more flash memory packages, one or more flash memory channels or the like. In some embodiments, data storage system 100 includes one or more storage devices 120.

Computer system 110 is coupled to storage controller 124 through data connections 105. However, in some embodiments computer system 110 includes device controller 124, or a portion of device controller 124, as a component and/or as a subsystem. For example, in some embodiments, some or all of the functionality of device controller 124 is implemented by software executed on computer system 110. Computer system 110 may be any suitable computer device, such as a computer, a laptop computer, a tablet device, a notebook, an internet kiosk, a personal digital assistant, a mobile phone, a smart phone, a gaming device, a computer server, or any other computing device. Computer system 110 is sometimes called a host, host system, client, or client system. In some embodiments, computer system 110 is a server system, such as a server system in a data center. In some embodiments, computer system 110 includes one or more processors, one or more types of memory, a display and/or other user interface components such as a keyboard, a touch-screen display, a mouse, a track-pad, a digital camera, and/or any number of supplemental I/O devices to add functionality to computer system 110. In some embodiments, computer system 110 does not have a display and other user interface components.

Non-volatile storage 130 is coupled to device controller 124 through connections 107. Connections 107 are sometimes called data connections, but typically convey commands in addition to data, and optionally convey metadata, error correction information and/or other information in addition to data values to be stored in non-volatile storage 130 and data values read from non-volatile storage 130. In some embodiments, however, device controller 124 and non-volatile storage 130 are included in the same device (e.g., an integrated device) as components thereof. Furthermore, in some embodiments, device controller 124 and non-volatile storage 130 are embedded in a host device (e.g., computer system 110), such as a mobile device, tablet, other computer or computer controlled device, and the methods described herein are performed, at least in part, by the embedded storage controller. Non-volatile storage 130 may include any number (i.e., one or more) of memory devices (e.g., NVM 134-1, NVM 134-2 through NVM 134-*n*) including, without limitation, persistent memory or non-volatile semiconductor memory devices, such as flash memory device(s). For example, flash memory device(s) can be configured for enterprise storage suitable for applications such as cloud computing, for database applications, primary and/or secondary storage, or for caching data stored (or to be stored) in secondary storage, such as hard disk drives. Additionally and/or alternatively, flash memory device(s) can also be configured for relatively smaller-scale applications such as personal flash drives or hard-disk replacements for personal, laptop, and tablet computers.

Memory devices (e.g., NVM 134-1, NVM 134-2, etc.) of non-volatile storage 130 include addressable and individually selectable blocks, such as selectable portion 131 of non-volatile storage 130 (see memory device 134-*n* in FIG. 1). In some embodiments, the individually selectable blocks (sometimes called erase blocks) are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for writing data to or reading data from the flash memory device.

In some embodiments, device controller 124 includes a memory management module 125, a host interface 129, and a non-volatile storage interface 128, and additional modules 126. Device controller 124 may include various additional features that have not been illustrated for the sake of brevity and so as not to obscure pertinent features of the example embodiments disclosed herein, and a different arrangement of features may be possible. Host interface 129 provides an interface to computer system 110 through data connections 105. Host interface 129 typically includes an input buffer and output buffer, not shown. Similarly, non-volatile storage Interface 128 provides an interface to non-volatile storage 130 though connections 107. In some embodiments, non-volatile storage Interface 128 includes read and write circuitry, including circuitry capable of providing reading signals to non-volatile storage 130 (e.g., reading threshold voltages for NAND-type flash memory).

In some embodiments, memory management module 125 includes one or more processing units 133 (sometimes herein called CPUs, processors, or hardware processors, and sometimes implemented using microprocessors, microcontrollers, or the like) configured to execute instructions in one or more programs (e.g., in memory management module 125). Processing units 133, or portions thereof, may be referred to herein as "processing circuitry." In some embodiments, the one or more CPUs 133 are shared by one or more components within, and in some cases, beyond the function of device controller 124. As shown in FIG. 1, memory management module 125 is coupled to host interface 129, additional modules 126, and non-volatile storage interface 128 in order to coordinate the operation of these components. In some embodiments, one or more modules of memory management module 125 may be implemented in computer system 110 (not shown). In some embodiments, one or more processors of computer system 110 (not shown) may be configured to execute instructions in one or more programs.

In some embodiments, memory management module 125 includes XRAM 135, to store metadata related to XOR signatures, described in detail below.

In some embodiments, additional modules 126 may include an error control module, provided to limit the number of uncorrectable errors inadvertently introduced into data during writes to memory or reads from memory. In some embodiments, the error control module may be executed in software by the one or more CPUs 133 of memory management module 125, and, in other embodiments, the error control module may be implemented in whole or in part using special purpose circuitry to perform data encoding and decoding functions. To that end, in some embodiments, the error control module may include an encoder and a decoder. The encoder encodes data by applying an error control code to produce a codeword, which is subsequently stored in non-volatile storage 130.

In some embodiments, when the encoded data (e.g., one or more codewords) is read from non-volatile storage 130, the decoder applies a decoding process to the encoded data to recover the data, and to correct errors in the recovered data within the error correcting capability of the error control code.

During a write operation, an input buffer (not shown) of device controller 124 typically receives data to be stored in non-volatile storage 130 from computer system 110. The data held in the input buffer is made available to the encoder, which encodes the data to produce one or more codewords. The one or more codewords are made available to non-volatile storage interface 128, which transfers the one or more codewords to non-volatile storage 130 in a manner dependent on the type of non-volatile storage being utilized.

A read operation is initiated when computer system (host) 110 sends one or more host read commands (e.g., via data connections 105) to device controller 124 requesting data from non-volatile storage 130. Device controller 124 sends one or more read access commands to non-volatile storage 130, via non-volatile storage interface 128 (e.g., via data connections 107), to obtain raw read data in accordance with memory locations (addresses) specified by the one or more host read commands. Non-volatile storage interface 128 provides the raw read data (e.g., comprising one or more codewords) to the decoder. If the decoding is successful, the decoded data is provided to an output buffer (not shown), where the decoded data is made available to computer system 110. In some embodiments, if the decoding is not successful, device controller 124 may resort to a number of remedial actions or provide an indication of an irresolvable error condition.

Figure 2:
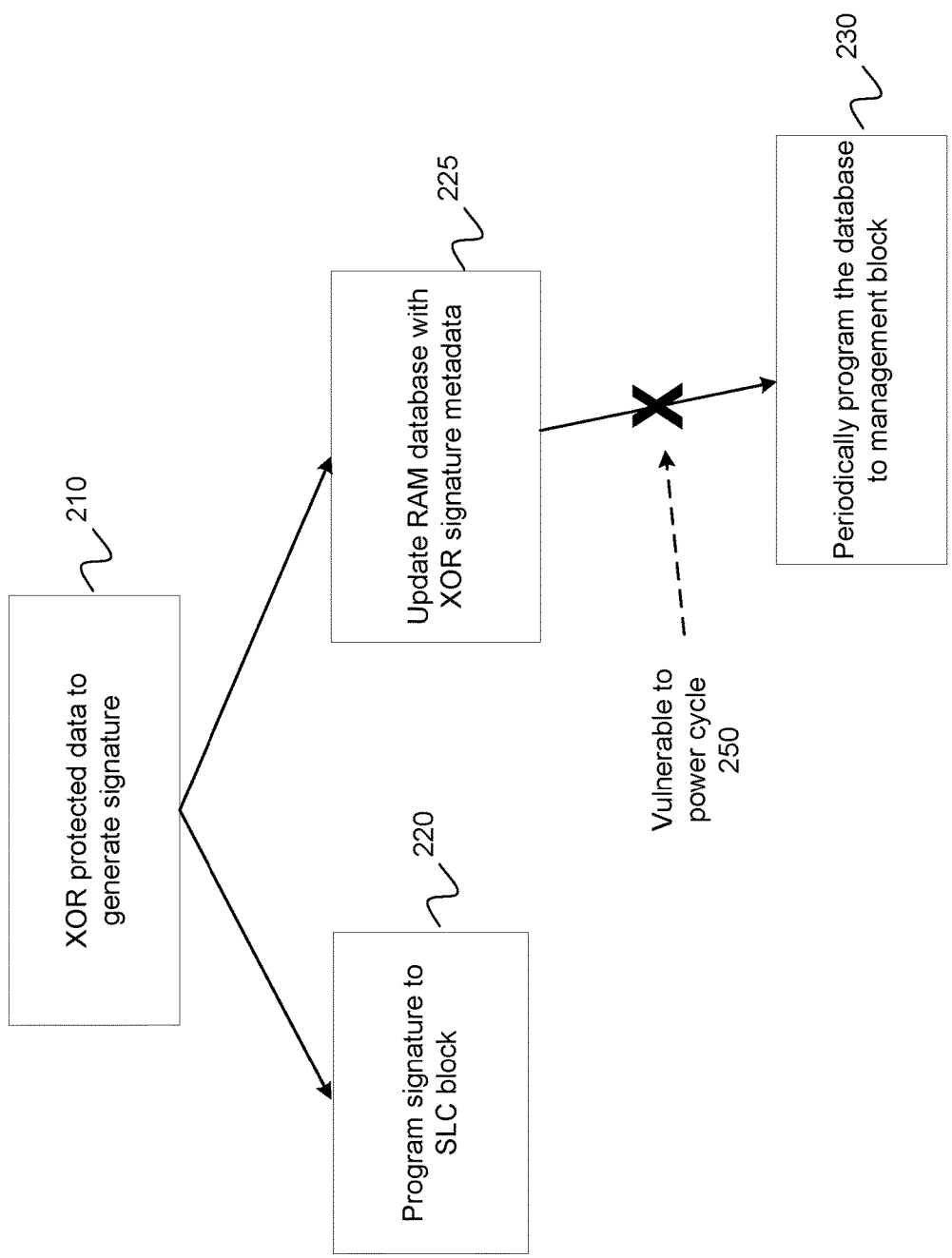
FIG. 2 illustrates a conventional method for storing XOR signatures in a rolling XOR technique.

As further context of the present disclosure, FIG. 2 illustrates a vulnerability of one implementation of a rolling XOR scheme. With reference to FIG. 2, there is shown a conventional method 200 of storing a XOR signature. Method 200 begins at block 210, with some XOR protected data that is to be used to generate a signature. For example, there may be four SLs of data to be respectively programmed into four dies of a storage medium, and an XOR signature is to first be obtained by XOR-ing all four of the SLs with each other. That way, if one of the SLs is not programmed due to some exception, by XOR-ing the signature with the other three SLs that were successfully programmed, the fourth SL may be recovered.

From block 210, conventional method 200 bifurcates, and proceeds to each of blocks 220 and 225 in parallel. At block 220 the XOR signature is written to an SLC block of non-volatile storage. However, as noted above, in a rolling XOR implementation, this is only temporary, and the signature is only kept while the SLs that comprise it are in danger of not being written to MLC. Similarly, at block 225, signature metadata is used to update a XOR signature database in RAM, such as, for example, RAM of a device controller. The signature metadata may include which pages of SLs are already XORed into the signature.

Figure 3:
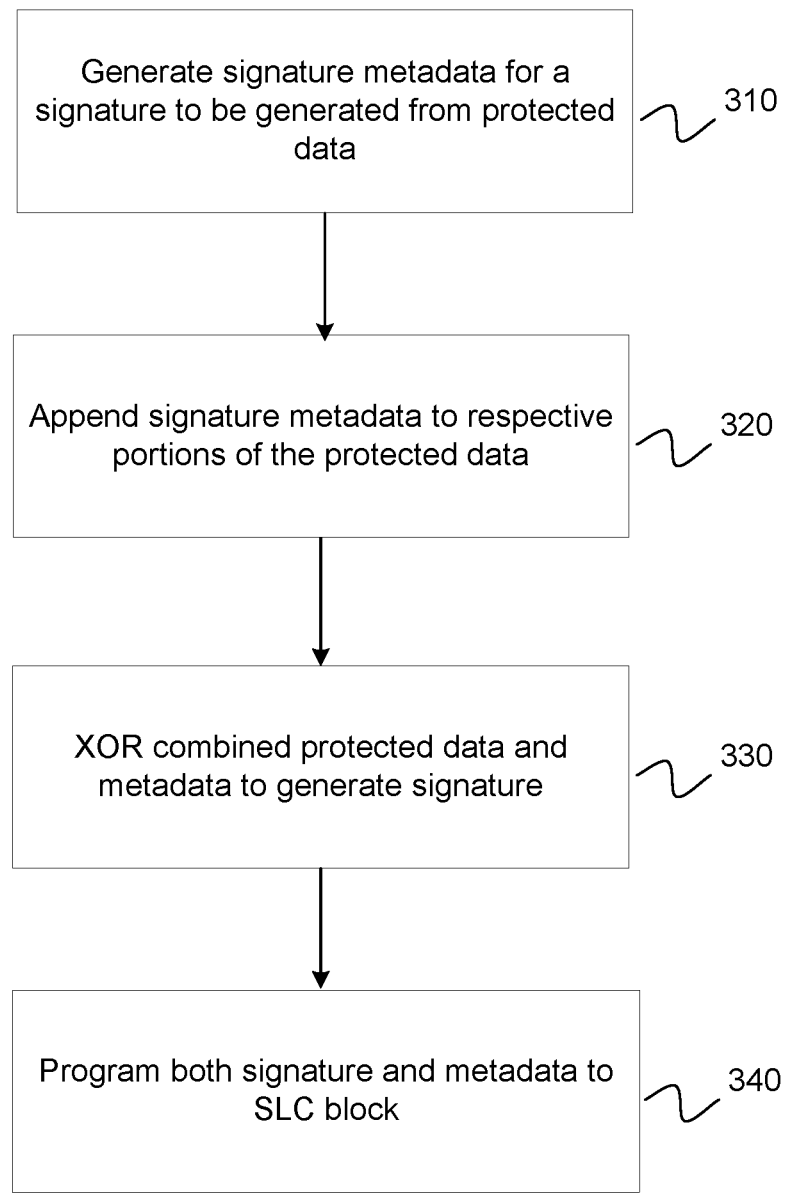
FIG. 3 illustrates an embodiment of a method of generating and storing signatures and signature metadata together, in accordance with embodiments disclosed herein.

Continuing with reference to FIG. 2, at block 225 a RAM database, for example, a database stored in XRAM 135 of FIG. 1, is updated with the XOR signature metadata. Periodically, as shown at block 230, the RAM database content is written to a management block of non-volatile memory. However, if a power loss occurs between block 225 and block 230, the signature content, i.e., metadata about the XOR signature, then stored only in the RAM database at block 225, but not yet moved to non-volatile storage at block 230, is lost. Were this to happen, whilst the signature was still stored in a SLC block, as shown at block 220, nothing else would be known about what the signature relates to, rendering it essentially useless. This is because there is no way to deduce which SLs are in the XOR signature as the data itself is random. This vulnerability of conventional method 200 to a power loss is illustrated by the large X superimposed on the arrow between blocks 225 and 230, and the indication at 250 in FIG. 2 that method 200 is here vulnerable to a power cycle. FIG. 3, next described, cures this vulnerability.

FIG. 3 illustrates an embodiment of a method of generating and storing signatures and signature metadata together, in accordance with embodiments disclosed herein. As noted, method 300 cures the vulnerability of method 200 of FIG. 2.

Method 300, as shown, includes blocks 310 through 340. In other embodiments, method 300 may have more, or less, blocks.

Method 300 begins at block 310, where signature metadata is generated for a signature to be generated from protected data. For example, there may be four SLs to be programmed to four dies of a NVM. The NVM may be MLC memory, and thus it is desired to protect the four SLs with a XOR signature, for example, until the four SLs are safely programmed into their respective MLC blocks. It is noted that, in this context, the term "safely programmed" refers to data in a block that can be verified as correct by performing a read operation following the programming operation. Thus, to protect the four SLs, metadata is created for the signature to be generated from the four SLs. For example, the metadata describes which SLs are contained in the XOR signature.

From block 310, method 300 proceeds to block 320, where the signature metadata generated in block 310 is appended to respective portions of the protected data. For example, one or more bytes containing the signature metadata may be respectively appended to each of the SLs by allocating a portion of each SL's header to signature metadata.

From block 320, method 300 proceeds to block 330, where the portions of the protected data and the signature metadata are XORed with each other to generate a signature. For example the 4 SLs, with their appended metadata headers, are XORed with each other to generate a combined signature+metadata structure.

Finally, from block 330, method 300 proceeds to block 340, where the signature+metadata structure is programmed into a SLC block. For example, the SLC block is a management block, separate from the data blocks into which the 4 SLs are programmed. As noted above, the signature+metadata structure programmed at block 340 may be erased once the underlying data blocks that the signature protects are safely programmed into their respective dies, with no shorts between SLs. It is here noted that as regards the other bytes in the SL headers that do not contain signature metadata, when the SLs, with header, are XORed together at block 330, the result of XOR-ing those bytes is not useful information. These other bytes in the SL headers are just like any of the data bytes that are XORed together, and can be recovered if the SL fails programming.

Thus, as illustrated in method 300 of FIG. 3, in one or more embodiments, metadata may be written to SLC along with corresponding XOR signatures, the metadata based on the structure of the XOR signatures. Further, to correctly detect and recover from all possible exception edge cases, in one or more embodiments additional control data may be appended to a header of each protected page as metadata. In one or more embodiments, this allows for the association of each signature portion to its corresponding protected data.

One advantage of encoding XOR signature content in associated metadata relates to management of a signature database. As described above with reference to FIG. 2, because management tables are not written on every XOR signature write to SLC, when recovering from a power cycle it is convenient to scan the metadata of a signature written to NVM and then deduce the signature content from it. In one or more embodiments, this allows for reconstruction of the content of the signature database in RAM.

As noted above with reference to block 330 of FIG. 3, when generating a signature of protected data, for a portion of protected data, for example a SL, both the data itself and a header containing signature metadata is XORed with one or more other similar portions of protected data. In order to implement such an enhanced signature, the metadata in each SL needs to be structured in a precise manner. This is next described with reference to FIGS. 4, 5A and 5B.

FIG. 4 illustrates byte index coding for metadata from several dies, in accordance with various embodiments. With reference thereto, metadata for a given protected die is coded in different bit positions for each of the protected dies, so that, for example, when headers of SLs from different dies are XORed together to generate a signature, the information is retained. As shown in the example of FIG. 4, four bytes of metadata are allocated to an XOR signature. The bytes are respectively assigned to four corresponding SLs used to create the signature. A SL to be programmed to each die has the control data in that die's assigned position, and zero in each other die's position of this example structure. Thus, when the SLs are XORed together, each die's control data remains in its assigned die. By reading the four bytes of control data, processing circuitry learns both the control data for each die, as well as which die is missing from the signature, as may occur when only partial signature is obtained and then written to a management block.

An example of a header encoding scheme, used to store signature header data according to one or more embodiments, is provided in Table A, below:

Continuing with reference to Table A, a second field of two bytes, named "string line in block" stores the string line number in the headers of flash management units (FMUs) that have the same position in their respective logical page as does their die number in their respective meta die, and stores a 0 for all other FMUs. For clarity, it is noted that a "string line" refers to just one string in a SL, i.e. a physical page, which is the minimum unit of protected data. Thus, in embodiments, in this field a SL number, for example, 9 bits, is stored. Thus, in FMU #0 header the SL # is stored when the first string is XORed into the signature, and in FMU #1 header the same SL # is stored when the second string is added into the XOR signature. If the signature is partial and only one string line was XORed, that SL # may be found in the respective FMU header.

Continuing further with reference to Table A, a third and final field of one byte, named "logical page bitmap" stores the logical page number of the SL being described. As noted above, because in one or more embodiments the protected data is being programmed to MLC NVM, this "logical page bitmap" field allows for encoding of logical pages in two level, three level (known as "TLC") or four level (known as "QLC") NVM. As shown, a logical page value, per die, is a binary number of two bits. Thus, in this one byte field, four logical pages, in each of four dies may be encoded. A first

TABLE A

Example Encoding Scheme

| FIELD | SIZE | D0 Value | D1 Value | D2 Value | D3 Value | REMARKS |
|---|---|---|---|---|---|---|
| DIE BITMAP | 1 Byte | 0b00000001 | 0b00000010 | 0b00000100 | 0b00001000 | Indicates which die |
| STRING LINE IN BLOCK | 2 bytes | SL number or 0 | SL number or 0 | SL number or 0 | SL number or 0 | String line (SL) number is in the range [0, WL*4], where WL is number of word lines in a block. |
| LOGICAL PAGE BITMAP | 1 byte | 0b000000LL | 0b0000LL00 | 0b00LL0000 | 0bLL000000 | LL represents the logical page number, in binary: 00, 01, 10, 11 |

In one or more embodiments, an individual header of an individual SL would only include one column shown in Table A. All four columns of possible header entries are thus shown in Table A to present a synoptic view. The example header encoding scheme of Table A allocates four bytes of SL header to signature metadata. In alternate embodiments, more, or less bytes of header may be allocated to signature metadata. A first field of one byte, named "die bitmap", indicates which of the four dies the SL is to be programmed to, as shown. In actuality, using one byte, this field can cover eight dies, but in the example of Table A only four possible entries are shown. The position of the "1" bit, in a byte of all other bits set to "0" indicates the die number. Thus, if the SL is to be stored in Die 0, then the value of "die bitmap" is 0b00000001, as shown. Similarly, if the SL is to be stored in Die 1, then the byte value is 0b00000010, if the SL is to be stored in Die 2, then the byte value is 0b00000100, and finally, if the SL is to be stored in Die 3, then the byte value is 0b00001000. As noted, by using the first four bits of this byte, another four dies could be indicated.

page is a 0, or 0b00, a second a 1, or 0b01, a third a 2, or 0b10 and a fourth logical page is encoded as a 3, or 0b11.

FIGS. 5A and 5B illustrate an example instantiation of the header encoding scheme of Table A as regards the "string in line block" field. With reference thereto, FIG. 5A illustrates an example of signature metadata for two dies (die 0 and die 1), where each indicate a string line value of 300, the value placed in their die-specific slot of the header field. Line 510 illustrates a portion of signature metadata associated with data to be written to Die 0, and line 520 illustrates an example portion of signature metadata for a portion of data to be written to Die 1. With reference to FIG. 5A it is readily seen that string line information is present only in the FMU in the logical page whose index matches its die number, and is zero in all other FMUs. Thus, when XOR-ing the metadata from the several dies, all of the information is retained, since for each FMU, information is present only in one of the XOR members, the others all have a value of zero. Thus, line 550, which is the XOR of lines 510 and 520, has the string line value of 300 in fields for both Die 0 and Die 1.

Similarly, FIG. 5B illustrates an example of signature metadata for all four dies (dies 0, 1, 2 and 3). Each of lines 510, 520, 530 and 540 have the string line value of 300 in the slot assigned to Die 0, Die 1, Die 2 and Doe 3, respectively. As shown, when the four metadata fields are XORed together, all of the metadata is retained. Thus, as shown, line 550, which is the XOR of lines 510, 520, 530 and 540, has the string line value of 300 in all die of the fields. It is here noted that had the SL values not been assigned to separate slots of the metadata header, when two or more SLs are XORed, the SL values may be lost, as any number XORed with itself outputs the value zero.

Figure 6:
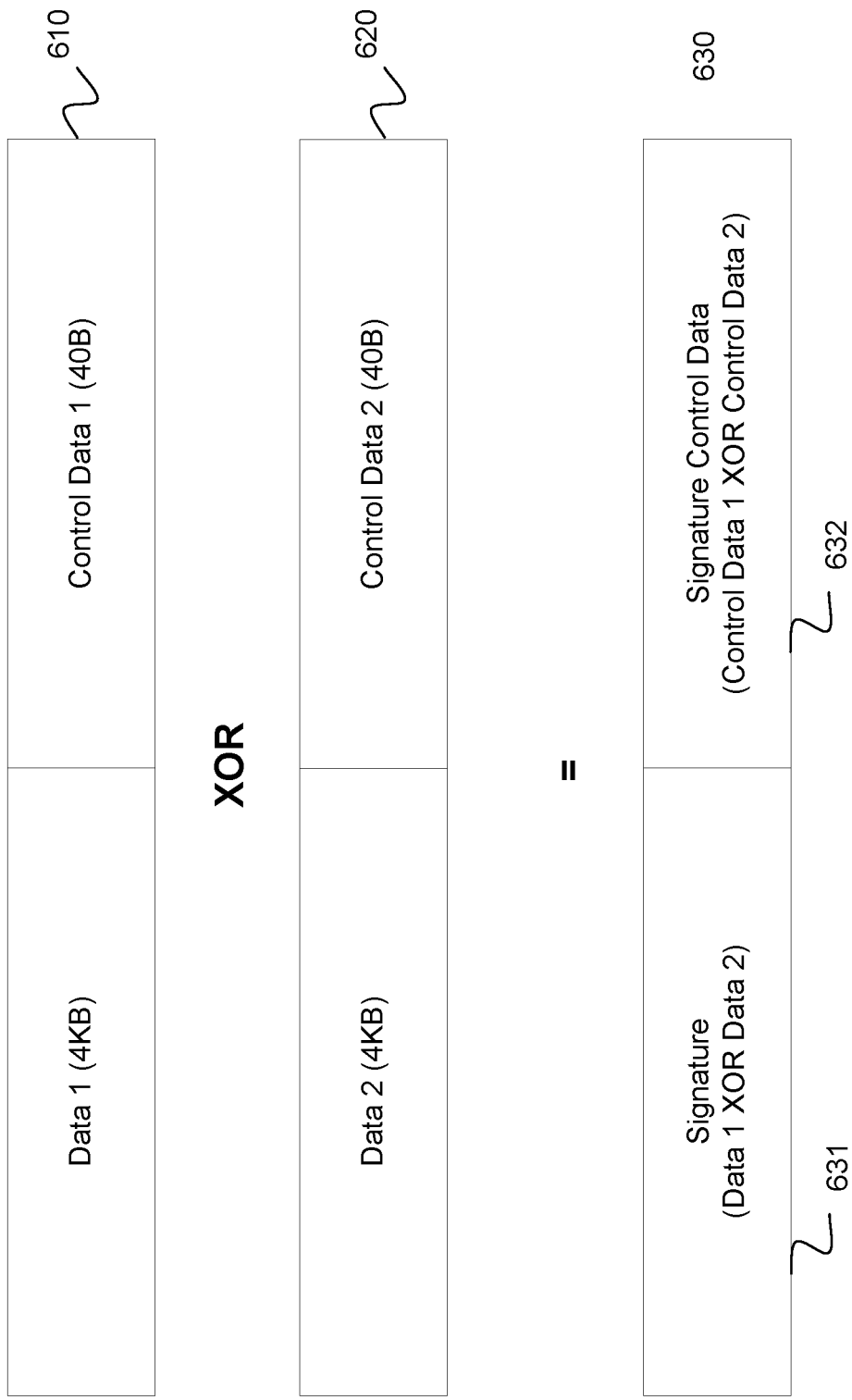
FIG. 6 illustrates generating a XOR signature of both data and related metadata data, in accordance with embodiments disclosed herein.

FIG. 6 illustrates the larger context of what is illustrated in FIGS. 5A and 5B, where a signature metadata header including control data is organized so as to provide separate slots in each field for each of the dies that the signature is to protect. Using bit index coding within the bytes of the header, the metadata may be XORed together, resulting in an enhanced signature control data header, with the accumulated information of all of the component control data headers. With reference thereto, line 610 has Data 1 and a header with Control Data 1, and line 620 has Data 2 with a header including Control Data 2. When lines 610 and 620 are XORed together, to yield combination signature and control data header 630, the respective data portions become the signature 631, and the respective header portions become the signature control data 632. As shown in block 340 of FIG. 3 described above, this combined signature and control data header 630 may be programmed to a SLC management block, and stored there until the underlying data that it protects is safely stored in MLC.

It is noted that the example data format of Table A does use some redundant encoding. Thus, the die index, for example, could alternatively be written in a denser manner. However, in embodiments that are designed to be robust to power failures, it is not possible to encode the metadata in advance, using only the index of the signature members (such as, for example, the "first" or "last" die in the signature). This is because of exceptions in the pipeline, which may result in a given die page not being encoded.

For example, assume that Die 0 in the example illustrated in FIG. 5A was erroneously not XORed to XRAM due to an exception, but Die 1 was encoded (which is possible in a common multi-channel system, when data regarding different dies comes from different channels). In this case the signature metadata in XRAM is zero for the Die 0 field, and, as a result, the content of the signature would be unknown. Having a greater number of dies further complicates this. Thus, in one or more embodiments, redundant coding enables robust recovery from exception in all edge cases.

The various embodiments discussed thus far addressed a simple case where each XOR signature contains only one SL across all dies, such as, for example, when one SL of a WL is written at a time However, in one or more alternate embodiments, it may be desired to have more than one SL within a signature. In fact, in some embodiments, it may be desired to have a variable number, greater than one, of SLs stored in one signature. Next described are embodiments concerning control for a protection scheme that supports a variable number of SLs within a signature.

In one or more embodiments, some SLs may be XORed together which means that there may be no protection for shorts between those SLs. The reason to implement this scheme is that the chance of a short between some SLs is lower than it is between other SLs, and thus, in some cases, there is no need to protect from these shorts.

For example, in one or more embodiments, it may be decided that SLs 5-9 may be protected together, so that no signature is stored per each of the SLs, but rather only one signature is stored for the entire SL group. This reduces the number of stored signatures on the one hand, but on the other hand it complicates the controls needed to support a variable number of SLs stored in one signature.

When a signature contains several string lines, the amount of possible signature members increases exponentially. As a result, it is no longer practical to use full redundant bitmap coding in a signature header, such as is illustrated in Table A, described above. A more practical approach for such embodiments is to add a pipeline stage that writes a header to the signature before it is dispatched to programming the SLC block.

In one or more embodiments, such an additional pipeline stage may be, for example, a "copy-word" operation performed by, for example, a low density parity check (LDPC) coder which simply copies four bytes from a specified memory location to a specified location in a XRAM signature. In such embodiments, this operation should not generally be performed by a central processing unit (CPU) as it must be precisely timed in the encoding pipeline.

In one or more embodiments, the additional signature header is zeroed in all host data pages. This avoids inserting barriers to the pipeline to synchronize the operation to execute after all the signature data has been XORed. Thus, if a data header is XORed after a copy word operation, it will not corrupt the copied header, because an XOR with zero is an identity operation, and thus the data remains unchanged.

In one or more embodiments, an example header for a multiple SL signature may contain fields such as, for example, location of first protected die page (die and SL number) and the number of die pages in the signature. This assumes that each signature contains consecutive die pages, which assumption is valid given that in case the continuity is broken, the current continuous signature is committed to flash prior to beginning the accumulation of the next signature.

In embodiments, for a two plane TLC die, such a copy-word operation is to be repeated 6 times, for each logical page and plane combination.

In one or more embodiments, to determine the content of a signature header, a simple RAM database may be kept. The RAM database may be updated on each additional die page that is accumulated to a current signature.

In multiple SL per signature embodiments, recovery from exceptions is more complicated than in those described above where multiple SLs are not combined. In such a recovery context, die pages which were sent to encoding (+XOR) but were not executed need to be rolled back logically from the RAM database. Then, if, for example, a 96 KB signature was partially XORed with 4 KB e-blocks, they need to be deXORed using the host data which is still available in controller RAM). It is noted that "deXORing" an e-block refers to removing that block from the partial signature, which may be done by XORing the partial signature with each of the e-blocks that need to be removed from it. This is because the inverse of an XOR operation is also an XOR operation, and thus, for example, if d=a XOR b XOR c, then d XOR c=a XOR b, or, symbolically, using the known operator sign "^" for XOR, a^b^c^c=a^b, and a^b^c^b=a^c. Similarly, if no rollbacks were performed, and a signature header's copy word was dispatched, it needs to be dispatched again, as there is no guarantee that this pipeline operation was completed. In one or more such embodiments, after all of the rollbacks have been completed, the RAM database then contains an accurate description of the members of XOR signature in RAM.

Figure 7:
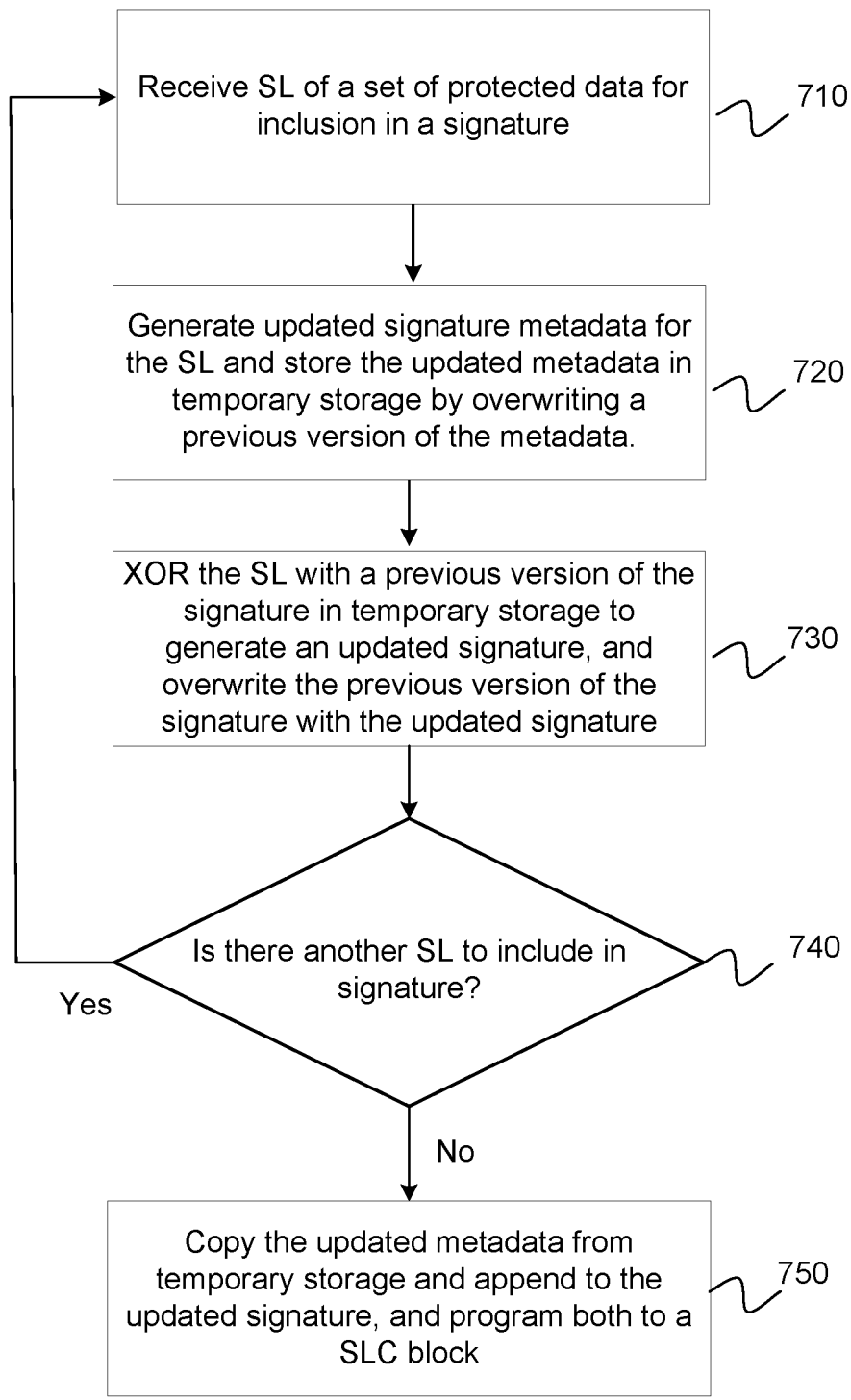
FIG. 7 illustrates an embodiment of a method of generating and storing an updated signature and updated metadata for one element of a set of protected data, in accordance with embodiments disclosed herein.

FIG. 7 illustrates an embodiment of a method 700 of generating and storing a signature and related metadata for two or more elements of a set of protected data, in accordance with "copy-word" embodiments disclosed herein, where, given a more complex structure, control data headers cannot be simply XORed with one another to create combined signature metadata. For example, there may be multiple sets of SLs that a signature is comprised of, and the large number of SLs involved makes it impractical to use redundant bitmap coding in the header, as described above. In this connection it is noted that the decision regarding which SLs are XORed together is based on the expected failure modes of the protected NVM and the level of reliability required in the specific project. For example, it may be decided to XOR together many SLs if there is no risk of more than 1 failure in that group of SLs.

Method 700, as shown, includes blocks 710 through 750. In other embodiments, method 700 may have more, or less, blocks. Method 700 begins at block 710, where a SL of protected data is received for inclusion in a signature. For example, as shown in FIG. 1, the SL may be received from a host computer system 110 by a storage device 120, in particular, for example, by device controller 124, through host interface 129, of FIG. 1. Thus, in one or more embodiments, method 700 may be implemented in a device controller of a storage device. Alternatively, the set of SLs to be combined in the signature may be received in parallel, placed in a queue in, for example, a device controller, and processed seriatim by the device controller.

From block 710, method 700 proceeds to block 720, where, for example, a device controller, such as device controller 124 of FIG. 1, for example, generates updated signature metadata for the SL and stores the updated metadata in temporary storage by overwriting a previous version of the metadata.

For example, the device controller, cognizant of all of the SLs that are to be participating in the signature may include in the updated metadata that this SL is the third out of 8 SLs overall to be included in the signature. Each time the device controller updates the metadata it may update, for example, a field in the metadata that indicates how many SLs have been included out of the total set at that point. Because, in the embodiment of method 700, signature metadata is not appended to the SLs, but rather separately stored in temporary storage, as each new SL is processed, the updated metadata (which, when updated with all of the WLs of the set of protected data, will eventually be appended to a completed signature) is used to overwrite any prior version of the metadata, so that the only metadata stored is the most current version. It is noted that it is not needed to keep any earlier version of the metadata because the order in which the SLs are inserted into the XOR signature is not important once they have been XORed together From block 720, method 700 proceeds to block 730, where, for example, a device controller generates an updated signature, by XOR-ing the SL with a previous version of the signature stored in temporary storage. As was the case with the updated metadata, the updated signature is used to overwrite any prior version of the signature. Moreover, if the SL received at block 710 is the first SL of the set of protected data, then at block 730 this SL is stored, and not a signature, it requiring at least two SLs to create an XORed signature.

From block 730, method 700 proceeds to query block 740, where it is determined whether there are more SLs to include in the signature. As noted above, a device controller, for example device controller 124 of FIG. 1, knows the SLs that comprise the set of protected data. Thus, for example, it may tally the SLs processed thus far, compare them to the list of the set, and determine that there are more to be received, or, for example, more in the device controller's queue.

If at query block 740 the response is "Yes", then method 700 returns to block 710, to receive and process the remaining SLs in the set. If, however, the response at query block 740 is "No", then the last SL has been processed, and the signature and the metadata are complete. In such case method 700 proceeds to block 750, where the updated memory is copied from the temporary storage, appended to the updated signature, and programmed to a SLC block of NVM.

Next described are various embodiments that address synchronization between protected data blocks and signature blocks. In one or more embodiments, to detect inconsistencies that stem from a UGSD, during device initialization the saved signatures may be synchronized to protected data.

For example, in a case where protected data is actually written to a die, but, due to a power loss that die is not included in the last saved XOR signature, only a partial signature may be stored in RAM, one which was not XORed with the data from that die. In other words, the updated signature stored in RAM (e.g., temporary storage referred to in blocks 730 and 750 of FIG. 7, described above) does not include one or more SLs that were part of the set of protected data SLs, and that were already stored in, for example, MLC NVM. In one or more embodiments, such a partial signature stored in RAM may be restored by reading and XOR-ing related protected data from flash.

Thus, in one or more embodiments, metadata added to a XOR signature may be used to check for consistency between a block of protected data and a corresponding signature block, without the need to rigorously search for the last written data. Such an example process is illustrated in FIG. 8, next described.

Figure 8:
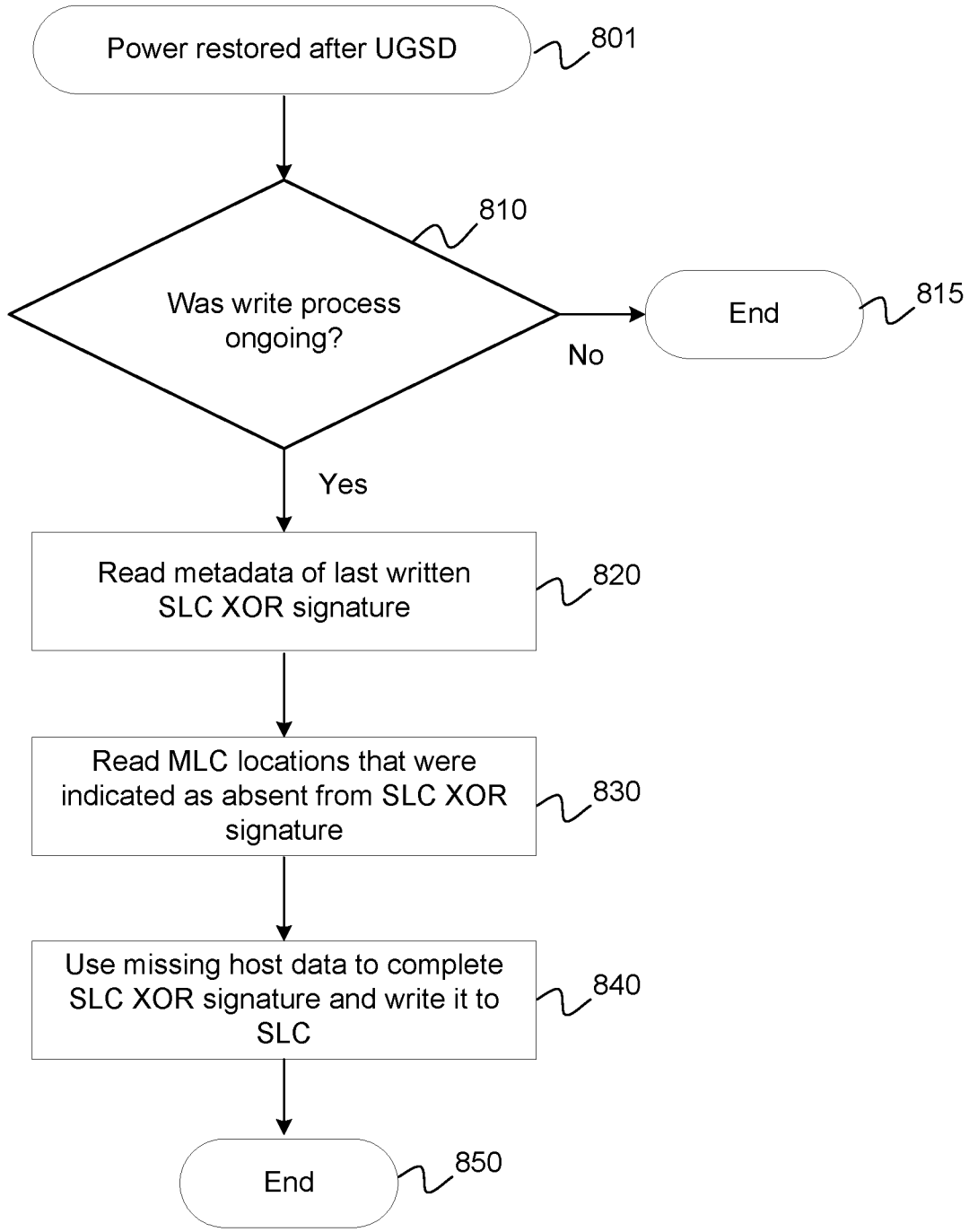
FIG. 8 illustrates an embodiment of a method of detecting inconsistencies between protected data blocks and signature blocks following a UGSD and restoring a partial signature for the protected data, in accordance with embodiments disclosed herein.

FIG. 8 illustrates an embodiment of a method 800 of detecting inconsistencies between protected data blocks and signature blocks following a UGSD, in accordance with embodiments disclosed herein. Method 800, as shown, includes blocks 801 through 850. In other embodiments, method 800 may have more, or less, blocks. In one or more embodiments, method 800 may be implemented where XOR signatures include one SL per die, as shown in, for example, FIGS. 3 through 5B, or alternatively, method 800 may be implemented where XOR signatures include more than one SL per die, as illustrated in the example signature and associated metadata generation process of method 700 of FIG. 7, described above.

Method 800 begins at block 801, where power is restored following a UGSD. Method 800 may be implemented by a device controller of a NVM storage device, such as, for example, device controller 124 of FIG. 1. In one or more embodiments, method 800 may be implemented by the device controller following every UGSD.

From block 801, method 800 proceeds to query block 810, where it is determined if, at the time of the UGSD, a write process was ongoing. This determination may be performed by the controller analyzing, during a controller mount, various NVM WLs to determine whether there was a partially written WL, and if so, which. If the response to query block 810 is "No", then method 800 terminates at block 815, as there is no partial XOR signature to be concerned with.

However, if the response at query block 810 was "Yes", then method 800 proceeds to block 820, where metadata of the last XOR signature written to SLC is read. It is here assumed that the relevant SLC XOR signature is still stored in SLC NVM, as described above. Thus, for example, a device controller, e.g., device controller 124 of FIG. 1, would read the metadata of the XOR signature.

From block 820, method 800 proceeds to block 830, where, for example, the device controller reads the MLC locations that were indicated in the SLC XOR metadata as being absent from the signature. For example, in a signature metadata structure equivalent to that shown in Table A described above, if a given die's slot is missing control data, it is clear that the metadata header of the WL that was to be programmed to that die was never XORed with the headers of the other WLs, and thus not part of the signature. The die locations in the header that have a value of 0 are thus the missing dies.

Or, for example, in one or more embodiments with more complex metadata, the last saved version of the metadata is the one programmed to the SLC, as shown in FIG. 7, block 750, as described above. That last updated metadata includes how many WLs of the set of protected data were actually included in the last updated signature.

From block 830, method 800 proceeds to block 840, where the missing host data, at the MLC locations obtained from the XOR signature in SLC, is used to complete the signature. For example, the device controller may load the missing WLs from their MLC locations and XOR them with the partial signature which is the last stored signature in SLC. The resulting XOR product is the full signature that protects all of the component WLs, and that now completed signature is written to SLC. From block 840, method 800 ends at block 850.

Thus, in one or more embodiments, efficient signature header coding uses a minimal amount of additional metadata space, but provides information that is useful in the management of its related protected data. In one or more embodiments, correct handling of edge cases insures that a signature database is consistent, and also prevents discarding of XOR signatures while they may still be needed. Moreover, signature metadata saves time in exception recovery, as it obviates reconstructing an entire signature from scratch by reading all of its components from flash. In one or more embodiments, signature metadata header coding and management enables an efficient rolling XOR recovery mechanism.

While the foregoing is directed to embodiments of the present disclosure, other and further embodiments of the disclosure may be devised without departing from the basic scope thereof, and the scope thereof is determined by the claims that follow.

What is claimed is:

1. A storage device controller comprising:
   a host interface, configured to receive one or more string lines (SLs) of data from a host, the one or more SLs to be programmed into a non-volatile memory (NVM); and
   processing circuitry, configured to:
      for each of the one or more SLs:
         generate signature metadata; and
         provide the signature metadata in a header of the SL;
      XOR two or more SLs of the one or more SLs with their respective signature metadata to generate a signature; and
      write the signature to the NVM, wherein the signature includes a signature portion and a metadata portion, the signature portion including an XOR of the two or more SLs, and the metadata portion including an XOR of the signature metadata of the two or more SLs.

2. The storage device controller of claim 1, wherein the processing circuitry is further configured to write the one or more SLs to MLC NVM and the signature to SLC NVM.

3. The storage device controller of claim 2, wherein the processing circuitry is further configured to:
   determine that the one or more SLs have been safely written to the MLC NVM; and
   delete the signature from the SLC NVM.

4. The storage device controller of claim 1, wherein the metadata of the signature indicates each SL that is used to generate the signature portion.

5. The storage device controller of claim 4, wherein the one or more SLs are to be each respectively programmed into a set of dies.

6. The storage device controller of claim 5, wherein within the signature metadata for each SL a die to which a SL is to be programmed is indicated by a relative position of an identifier of the die within a pre-defined metadata field.

7. The storage device controller of claim 5, wherein within the signature metadata for each SL a logical die to which a SL is to be programmed is indicated by a relative position of an identifier of the logical die within a pre-defined metadata field.

8. A storage device controller comprising:
   a host interface, configured to receive one or more string lines (SLs) of data from a host, the one or more SLs to be programmed into a non-volatile memory (NVM); and
   processing circuitry, configured to:
      for each of the one or more SLs:
         generate signature metadata; and
         provide the signature metadata in a header of the SL;
      XOR two or more SLs of the one or more SLs with their respective signature metadata to generate a signature; and
      write the signature to the NVM;
   wherein the processing circuitry is further configured to, following power restoration after an ungraceful shut down (UGSD):
      determine if at a time of the UGSD there was an ongoing write;
      read a metadata portion of the last signature stored in SLC NVM; and
      determine if any of the one or more SLs is absent from the signature.

9. The storage device controller of claim 8, wherein the processing circuitry is further configured to, for each of the SLs absent from the signature:
   XOR SLs missing from the last stored signature with the last stored signature to complete the signature; and
   write the completed signature to SLC NVM.

10. A storage device, comprising:
    SLC non-volatile memory (NVM) and MLC NVM; and
    a device controller, comprising:
       a host interface, configured to receive a current string line (SL) of data from a host, the current SL one of a set of SLs to be programmed into dies of the MLC NVM; and
       processing circuitry, configured to:
          generate signature metadata for the current SL and store the metadata in temporary storage by overwriting a previously stored version of the signature metadata;

XOR the current SL with a previously stored version of a signature to generate an updated signature and store the updated signature in temporary storage by overwriting a previous version of the signature, wherein the signature includes a signature portion and a metadata portion, the signature portion including an XOR of the set of SLs, and the metadata portion including an XOR of the signature metadata of the set of SLs; and program both the updated signature and the signature metadata to a block of the SLC NVM.

11. The storage device of claim 10, wherein the device controller further comprises random access memory (RAM), and wherein the RAM comprises the temporary storage.

12. A storage device, comprising:
SLC non-volatile memory (NVM) and MLC NVM; and
a device controller, comprising:
a host interface, configured to receive a current string line (SL) of data from a host, the current SL one of a set of SLs to be programmed into dies of the MLC NVM; and
processing circuitry, configured to:
generate signature metadata for the current SL and store the metadata in temporary storage by overwriting a previously stored version of the signature metadata;
XOR the current SL with a previously stored version of a signature to generate an updated signature and store the updated signature in temporary storage by overwriting a previous version of the signature; and
program both the updated signature and the signature metadata to a block of the SLC NVM, wherein if there is no previous version of signature metadata in the temporary storage, the processing circuitry is further configured to store the signature metadata for the current SL in the temporary storage.

13. A storage device, comprising:
SLC non-volatile memory (NVM) and MLC NVM; and
a device controller, comprising:
a host interface, configured to receive a current string line (SL) of data from a host, the current SL one of a set of SLs to be programmed into dies of the MLC NVM; and
processing circuitry, configured to:
generate signature metadata for the current SL and store the metadata in temporary storage by overwriting a previously stored version of the signature metadata;
XOR the current SL with a previously stored version of a signature to generate an updated signature and store the updated signature in temporary storage by overwriting a previous version of the signature; and
program both the updated signature and the signature metadata to a block of the SLC NVM, wherein if there is no previous version of the signature in the temporary storage, the processing circuitry is further configured to store the current SL in the temporary storage.

14. A storage device, comprising:
SLC non-volatile memory (NVM) and MLC NVM; and
a device controller, comprising:
a host interface, configured to receive a current string line (SL) of data from a host, the current SL one of a set of SLs to be programmed into dies of the MLC NVM; and processing circuitry, configured to:
generate signature metadata for the current SL and store the metadata in temporary storage by overwriting a previously stored version of the signature metadata;
XOR the current SL with a previously stored version of a signature to generate an updated signature and store the updated signature in temporary storage by overwriting a previous version of the signature; and
program both the updated signature and the signature metadata to a block of the SLC NVM, wherein the set of SLs is to be programmed into a set of dies of the MLC, and wherein the signature metadata indicates a number N of the SLs is to be programmed into each die.

15. A storage device, comprising:
SLC non-volatile memory (NVM) and MLC NVM; and
a device controller, comprising:
a host interface, configured to receive a current string line (SL) of data from a host, the current SL one of a set of SLs to be programmed into dies of the MLC NVM; and
processing circuitry, configured to:
generate signature metadata for the current SL and store the metadata in temporary storage by overwriting a previously stored version of the signature metadata;
XOR the current SL with a previously stored version of a signature to generate an updated signature and store the updated signature in temporary storage by overwriting a previous version of the signature; and
program both the updated signature and the signature metadata to a block of the SLC NVM, wherein the signature metadata for the current SL indicates how many SLs, including the current SL, are included in the updated signature.

16. A storage device, comprising:
SLC non-volatile memory (NVM) and MLC NVM; and
a device controller, comprising:
a host interface, configured to receive a current string line (SL) of data from a host, the current SL one of a set of SLs to be programmed into dies of the MLC NVM; and
processing circuitry, configured to:
generate signature metadata for the current SL and store the metadata in temporary storage by overwriting a previously stored version of the signature metadata;
XOR the current SL with a previously stored version of a signature to generate an updated signature and store the updated signature in temporary storage by overwriting a previous version of the signature; and
program both the updated signature and the signature metadata to a block of the SLC NVM, wherein the signature metadata for the current SL indicates a location of a first protected die page.

17. An apparatus, comprising:
memory means;
means for receiving one or more string lines (SLs) of data from a host;
means for programming the one or more SLs to the memory means;
means for generating signature metadata for the one or more SLs, wherein a signature includes a signature portion and a metadata portion, the signature portion including an XOR of the one or more SLs, and the metadata portion including an XOR of the signature metadata of the one or more SLs;

means for XORing the one or more SLs with a previously stored signature metadata to generate an updated signature metadata; and means for programming the updated signature metadata and the signature metadata to the memory means.

18. The apparatus of claim 17, wherein the memory means comprises SLC non-volatile memory (NVM) and MLC NVM.

19. An apparatus, comprising:

memory means;

means for receiving one or more string lines (SLs) of data from a host;

means for programming the one or more SLs to the memory means;

means for generating signature metadata for the one or more SLs;

means for XORing the one or more SLs with a previously stored signature metadata to generate an updated signature metadata;

means for programming the updated signature metadata and the signature metadata to the memory means;

means for determining, following an ungraceful shut down (UGSD), whether a write process to a MLC NVM was ongoing;

means for reading metadata of a last written XOR signature to a SLC NVM, the XOR signature protecting data being written to the MLC NVM, wherein the means for reading metadata further comprises means for obtaining memory locations that were indicated as absent from the last XOR signature;

means for determining if the last written XOR signature is a partial signature;

means for completing the XOR signature; and means for writing the completed XOR signature to SLC NVM.

* * * * *